Dec. 1, 1942.  C. L. JOHNSON  2,303,695
DIFFERENTIAL RUDDER FOR AIRPLANES
Filed July 22, 1940
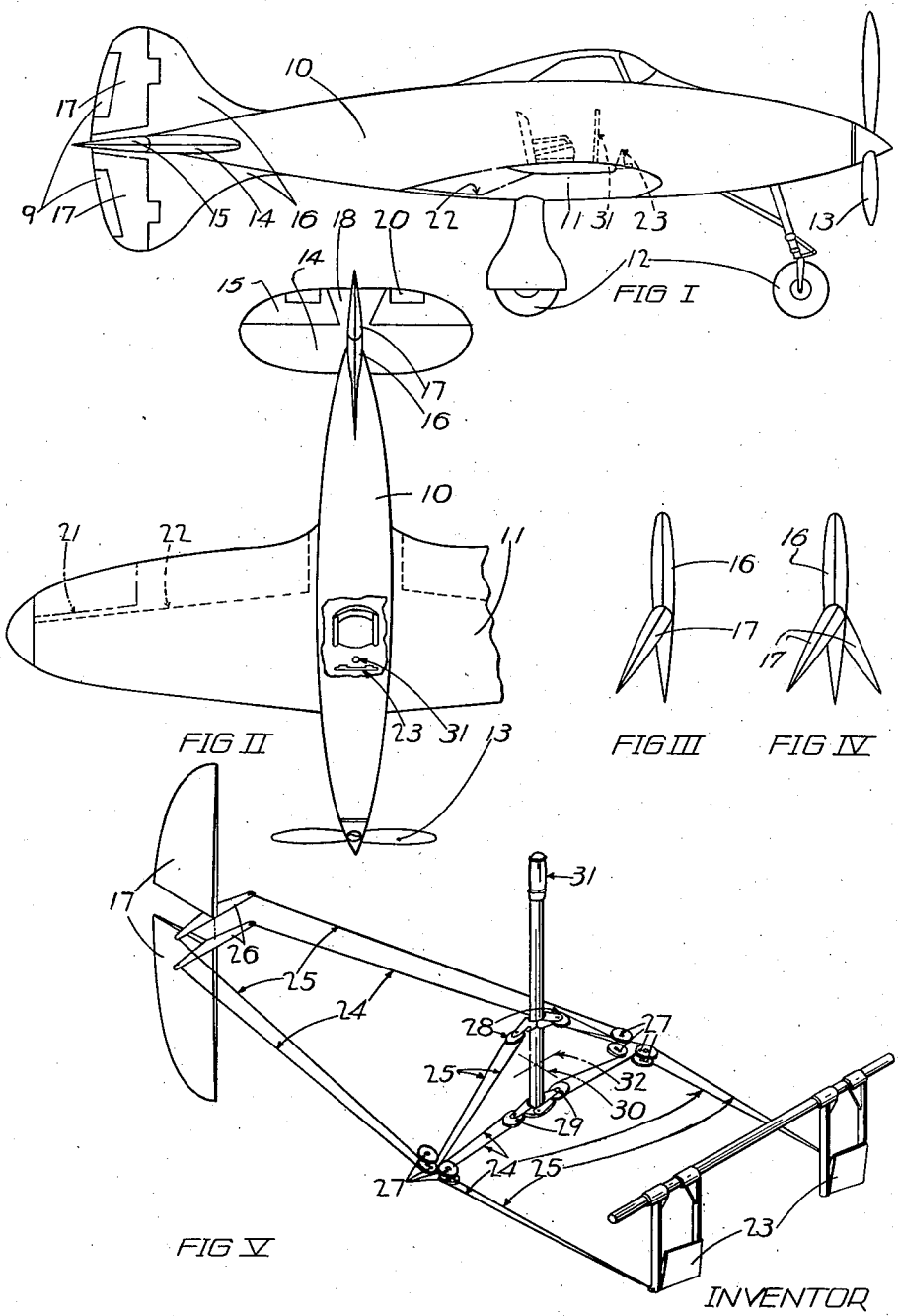
INVENTOR
Clarence L. Johnson Patented Dec. 1, 1942

2,303,695

UNITED STATES PATENT OFFICE 2,303,695

DIFFERENTIAL RUDDER FOR AIRPLANES

Clarence L. Johnson, Burbank, Calif., assignor to Lockheed Aircraft Corporation, Burbank, Calif.

Application July 22, 1940, Serial No. 346,787

2 Claims. (Cl. 244—83)

This invention relates to an improved form of combined directional and lateral control for airplanes, comprising a differential or split rudder for producing various combinations or turning, rolling, and banking movements of the airplane.

In the control of airplanes it has been customary to utilize hinged ailerons forming portions of the trailing edges of the wings, near the outer ends thereof. Such ailerons set up an unbalanced drag, when used for rolling movements, that has such a long lever arm that it tends to throw the airplane into an undesirable yawing movement that must be counteracted by opposite movement of the rudder, still further adding to the drag acting to slow down the speed of the airplane. Under conditions approaching the critical stalling speed, the additional drag produced by opposing movements of the ailerons and rudder may cause a stall.

It is accordingly an object of this invention to provide a pair of independent rudders disposed on opposite sides of a longitudinal axis of the airplane, whereby lateral control of the airplane may be varied from a pure roll without a yawing tendency, through various combinations of banks and turns, to a pure turning movement; eliminating, or greatly reducing, the need of wing tip ailerons and thereby increasing the available wing space for wing flaps or other high lift devices increasingly needed for satisfactory take-off and landing characteristics, as designers strive for higher speeds.

It is another object of this invention to provide an improved airplane control means for operating oppositely positioned rudders, the control means being variable through the range from simultaneous to opposing movements of the rudders.

It is a further object of this invention to provide an improved directional and lateral control means for airplanes wherein oppositely disposed rudders may be operated independently or together to produce various combinations of turns and rolls or banks, the controls being such that ailerons, if used, may be simultaneously operated in correct relationship with rolling movements produced by the rudders.

Other and further important objects of this invention will be apparent from the disclosures in the specification and the accompanying drawing.

This invention in its preferred form is illustrated in the drawing and hereinafter more fully described.

In the drawing:

Figure I is a side elevation of an airplane embodying the twin rudders of this invention.

Figure II is a plan view thereof.

Figures III and IV illustrate simultaneous and opposed movements respectively of the twin rudders, which are adjustable to intermediate positions between these extremes.

Figure V is a perspective diagrammatic showing of a control mechanism for operating the twin-rudders through the range between rolling and turning movements.

As shown:

A complete airplane structure is shown in Figures I and II to illustrate the installation of the rudders of this invention, it being understood that details of the type and arrangement of the airplane per se have no bearing on the present invention, which is adaptable to various other types of aircraft. The airplane chosen for illustrative purposes comprises a fuselage 10 having monoplane wings 11, a tricycle landing gear 12, a tractor propeller 13, a horizontal stabilizer 14, and elevators 15.

Upper and lower vertical stabilizers 16 carry rudders 17 which are independently pivoted thereto, the rudders being preferably movable over a rearward extension 18 of the horizontal stabilizer 14. It is not essential to this invention that the vertical stabilizers 16 be used, as the rudders 17 can provide sufficient vertical surface for stabilizing purposes; and the rudders need not be hinged at their forward edges as shown, but may be more or less balanced about a vertical pivot, thus functioning as adjustable fins. While the rudders 17 are shown as of substantially the same size, it will be evident that one may be appreciably larger than the other if more fin area is desired above or below the fuselage. The rearward stabilizer extension 18 is not essential, the only requirement being to prevent interference between the elevators and rudders in their extreme angular positions. It is customary to provide trimming tabs 19 on the rear edges of the rudders 17, either or both of which tabs are adjustable to compensate for engine torque reaction. Similar trimming tabs 20 are shown on the elevators 15.

The use of spaced differentially movable rudders permits the reduction in size or entire elimination of conventional ailerons near the outer ends of the trailing edges of the wings 11. It is also possible to operate the rudders and ailerons together to assist in rolling and yawing movements, or the rudders can be used in opposition to the ailerons to correct the yawing tendency introduced by the ailerons alone. If ailerons are retained they may be of considerably reduced size, or in the form of split flaps, as indicated by the dotted outline 21 in Figure II. Split flaps forming the upper surface of the wing would not interfere with the use of high lift devices extending along and beneath most of the trailing edge of the wing, such high lift devices, for example a rearwardly extending or trailing flap, indicated by the numeral 22, serving to increase the wing area for take-off and landing, and being essential to reduce the landing speed in high performance airplanes.

The spaced rudders may be operated differentially or in unison by a combined foot pedal and stick mechanism, as shown in Figure V. In this figure, separate foot pedals 23 have duplicate control cables 24 and 25 to operating bars 26 on the upper and lower rudders, the cables being led over stationary pulleys 27 to upper and lower pulleys 28 and 29 equally distant from a pivot point 30 of a control stick 31. The stick 31 is also pivoted on a traverse axis 32 for a conventional control of the elevators 15 which control has been omitted from the drawing to avoid confusion. It will be evident that the elevators 15 could be given a differential movement of the same type as disclosed herein for the rudders; and that ailerons, if used could also be controlled by the stick 31 in the usual manner.

In the operation of the spaced rudders it will be convenient to first trace the control for the upper rudder, bearing in mind that the cables 24 therefor are duplicated on each side. Assuming that the rudders are to be pivoted counterclockwise for a right turn, the lower pedal is pushed forward, the cable linkage pulling the other pedal back to the same extent. As long as the control stick 31 is held in neutral, both upper and lower rudders will be turned in the same direction and to the same extent. If the stick 31 is now tilted towards the left it will tend to slack off on the near side upper cable 25 and tighten up on the near side lower cable 24 thus tending to decrease the angle of the upper rudder and increase the angle of the lower rudder. At the same time the far side cables are oppositely affected so that no actual slack is developed in the control cables by stick movement. It will be evident that the pedals and stick can be operated simultaneously or separately, the stick providing for pure rolling movements, the pedals for a flat turn, and combinations thereof providing a differential rudder movement which banks as well as turns the airplane.

It will be evident that the symmetrical rudder arrangement provides for a true rolling movement on the axis of the plane without introducing yawing components that require opposite rudder to maintain a true course.

Having thus described my invention and the present preferred embodiment thereof, I desire to emphasize the fact that many modifications may be resorted to in a manner limited only by a just interpretation of the following claims.

I claim:

1. In an airplane, a pair of substantially aligned control surfaces separately pivoted on opposite sides of the longitudinal axis of the airplane, control means for normally operating said control surfaces in unison to alter the direction of said airplane axis, comprising a pair of pedals each connected by cable systems to each of said control surfaces, and means for varying the response of each control surface to the pedal movements, comprising a pivoted control member having pulleys linked thereto on opposite sides of the pivot respectively and linked in the cable systems extending to the control surfaces on the corresponding sides of the airplane axis whereby a movement of the control member about its pivot is adapted to shorten one side and correspondingly lengthen the other side of the cable systems connecting the pedals to one control surface while correspondingly lengthening one side and shortening the other side of the cable systems for the opposite control surface.

2. In an airplane, in combination, a fuselage, a pair of fixed vertically extending stabilizing surfaces positioned adjacent the rear end of said fuselage and having a longitudinal lever arm relative to the center of gravity of the airplane, said surfaces being arranged one above and the other below the longitudinal axis of the fuselage, a pair of rudder surfaces separately pivoted to the rear edges of said stabilizing surfaces, means including pedals connected by control members to the rudder surfaces for operating the rudder surfaces in unison in the same direction to provide turning movements of the airplane, a control stick mounted to swing about a pivot in a plane at a right angle to the longitudinal axis of the fuselage, said control stick being interconnected respectively to said control members at points spaced on opposite sides of said pivot, the movement of said control stick being effective to vary the response of one rudder surface relative to the other from unequal movements in the same direction to movements in opposite directions to provide for rolling movement of the airplane.

CLARENCE L. JOHNSON.